(No Model.)
W. A. ROGERS.
ELECTRO MAGNETIC CLUTCH FOR STEP BY STEP MOVEMENTS.
No. 310,913. Patented Jan. 20, 1885.
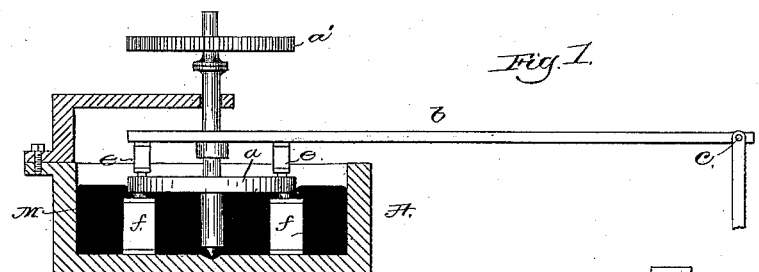
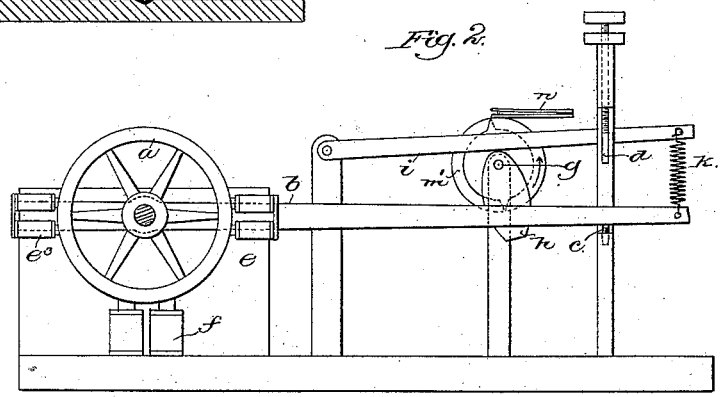
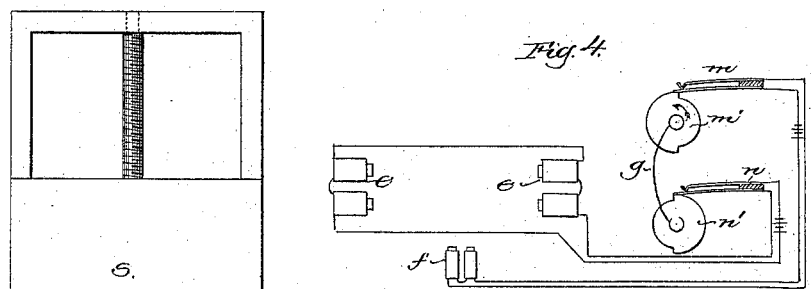
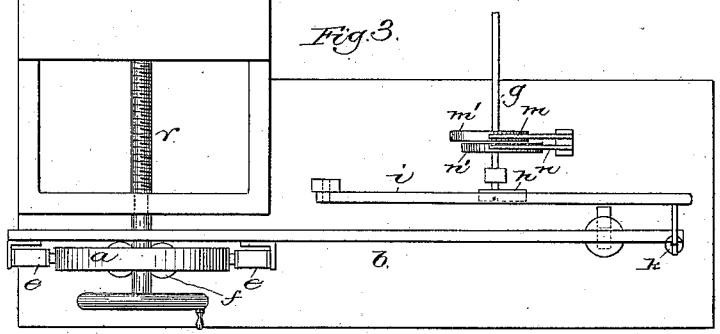
Witnesses.
John F. C. Prinbert
Henry Marsh
Inventor,
William A. Rogers,
by Crosby & Gregory
atty's.

UNITED STATES PATENT OFFICE.

WILLIAM A. ROGERS, OF CAMBRIDGE, MASSACHUSETTS.

ELECTRO-MAGNETIC CLUTCH FOR STEP-BY-STEP MOVEMENTS.

SPECIFICATION forming part of Letters Patent No. 310,913, dated January 20, 1885.

Application filed April 14, 1884. (No model.)

*To all whom it may concern:*

Be it known that I, WILLIAM A. ROGERS, of Cambridge, county of Middlesex, State of Massachusetts, have invented an Improvement in Mechanical Movements, of which the following description, in connection with the accompanying drawings, is a specification, like letters on the drawings representing like parts.

My invention relates to mechanism employed for moving an object through a number of uniform spaces, or for dividing a circle or lineal measure into a definite number of equal parts.

Dividing-engines, gear-cutting machines, and other machines of similar nature have in some cases contained a rotating part or index-wheel, and a device having reciprocating or oscillating movement arranged to engage the said wheel and move it with it for a definite space in one direction, the wheel being locked or retained stationary, while the actuating device makes its return movement. The means employed for thus locking the wheel and for connecting the actuating device with it have usually consisted of a mechanical latch or frictional gripping device of some nature requiring a mechanical movement of one or more parts to effect the locking and unlocking. Such mechanical movement is liable to derange the parts or to produce some variation in their relative positions, which, in instruments requiring a high degree of accuracy, is very objectionable.

The present invention has for its object to avoid such objection; and it consists in what may be called a "magnetic clamp" or "locking device," the same consisting of one or more electro-magnets having their poles in contact with the member to be moved, but sliding freely over its surface, except when the said magnets are energized, when the attractive force will fasten together or unite the material of the magnet and of the member to be moved—which is of course of iron or magnetic material—causing it to move with the actuating device, or remain locked by means of a stationary magnet while the actuating device and magnets movable therewith are making their return movement, the stationary magnet being then energized, but the movable magnet not so. When, as is generally the case, the member to be moved is a wheel or disk, it is desirable, for some kind of work, to give the said disk a special kind of bearing, in which the wear is reduced to a minimum, so as to cause the least possible variation in the relative position of the parts while the apparatus is in operation. For this purpose the disk is floated or partially supported on mercury, so that its pivot merely has to steady or guide it in its movement, but has but little if any weight to sustain.

One embodiment of the invention herein shown and described consists of a wheel or disk supported on such a mercurial bearing, and adapted to move a gear or circle for the purpose of spacing the teeth or graduating, as may be desired; and the invention is also shown applied to the screw of a dividing-engine for linear measures, the invention being applicable for any purpose where it is desired to give an object or device a number of consecutive movements equal or having a definite relation to one another.

Figure 1 is a sectional view of an apparatus embodying this invention, in which the member to be moved has a mercurial support or bearing. Fig. 2 is an end elevation of a portion of a screw-dividing engine embodying this invention; Fig. 3, a plan view thereof; Fig. 4, a diagram to be referred to.

The member that is to be moved a number of equal definite distances is shown in this instance as consisting of or containing as one of its elements a wheel, *a*, composed wholly or in part of magnetic material, preferably soft iron. The shaft or arbor upon which the said wheel rotates has pivotally fitted upon it an actuating arm or member, *b*, which is free to turn on the said shaft or arbor or around the axis of the said wheel independently thereof. The arm *b* is made of considerable length, and its movement about the said axis is limited by stops *c d*, one of which may be fixed with relation to the frame-work of the apparatus, and the other of which is movable for adjusting the amount of movement that the arm *b* is permitted to have.

In Fig. 1 but one of the stops for the arm *b* is shown, this figure being especially intended to illustrate the mercurial bearing for the moved member $a$, which is in this instance of the invention contained in a basin, A, having a pivotal support for the lower end of the arbor of the disk or wheel $a$, the upper end of the said arbor, steadied by a suitable bearing, being connected with a wheel or circle, $a'$, which may be intended for a gear the teeth of which are to be spaced, or may be a circle to be divided into degrees or otherwise spaced or graduated, and which is preferably mounted on the arbor, axle, or pivot upon which it is to turn when in the finished machine or instrument. The basin A is filled with mercury, as shown at M, to the proper depth, so that the disk $a$ is buoyed up by or partially supported on it, and its pivot relieved of almost all pressure, so that its wear is reduced to a minimum, it having merely to steady or prevent lateral movement of the disk. When the stop $d$ (see Fig. 2) has been adjusted, there is a definite space between it and the stop $c$, and the arm $b$ when oscillated back and forth between the said stops will always move through exactly the same distance. If, therefore, the arm $b$ can be positively and securely attached to the wheel $a$ in its movement in one direction—as from the stop $c$ to the stop $d$—it will at each such movement cause the said wheel to move with it through an equal distance at each time, and if the arm $c$ can be disconnected from the said wheel in making its return movement from $d$ to $c$ and the wheel held stationary during such movement, it will be seen that the successive movements of the wheel $a$ will be in one direction, each taking place from the point where the last movement ended, and all the movements being of equal amount. For convenience the movement of the arm $b$ from $c$ to $d$ will be called the "forward" movement, and in the opposite direction will be called the "return" or "backward" movement.

In order to connect the wheel $a$ with the arm $b$ during its forward movement, the said arm is provided with one or more electro-magnets, $e$, there being preferably at least two acting at different points on the said wheel. The poles of the said magnets have their surfaces fitted accurately to the surface of the wheel, and when not energized move over it with the same friction as any other accurately-fitted metallic surfaces. When, however, the magnets are energized by an electric current, the magnetic attraction will cause their poles to adhere strongly to the said wheel, and thus connect it firmly with the arm $b$, the said connection being made without any mechanical movement, but by the molecular change in condition of the connected parts produced by the electric current. This change of condition takes place and the parts are connected or disconnected without danger of producing any movement of the one part relative to the other, and also without wear of the parts—a result not attained by any other mode of connection used in such machines. Before the arm $b$ begins its return movement the current is removed from the magnets $e$, so that they no longer serve to fasten the wheel and arm together; and in order to hold the wheel so that it will not be moved back with the arm on account of the slight friction between the wheel and the arm and its connected parts, the wheel is locked or held stationary by one or more stationary electro-magnets, $f$, connected with the framework of the machine, and having substantially the same relation to the wheel as the magnets $e$ previously described.

Suitable keys or circuit-closers may be employed to control the circuit of the magnets $e$ and $f$, one of the said circuits being closed before the other is opened, so that the wheel will be positively held by one set of magnets before it is released by the other. The arm $b$ may be vibrated or moved back and forth between the stops $c$ $d$ by hand, and the circuit-closers may also be operated by hand, if desired, or the operation of the said arm and circuit-closers may be automatic, as shown in Figs. 2, 3, and 4, depending upon appliances operated by a rotary shaft, $g$. A cam, $h$, on the said shaft $g$ operates an arm, $i$, having a flexible connection, as by the spring $k$ with the arm $b$, the said cam causing the arm $i$ to oscillate up and down, causing the arm $b$ to accompany it until arrested by the stops, when the further movement of the arm $i$ produced by the cam is accompanied by an extension or contraction of the spring $k$. The arm $b$ makes its downward movement in this instance under the action of gravity, and the cam $h$ is provided with portions concentric with the axis of rotation, thus causing the arms $i$ and $b$ to pause or dwell for a short time at the end of their upward and downward movement sufficient for the changes to be made in the circuits of the magnets $e$ $f$. The circuit-closer $m$ of the magnet $f$ (see Fig. 4) is controlled by a cam, $m'$, which opens the said circuit after the arm $b$ has come to rest on the stop $c$ and before it begins its movement from the said stop, and the said cam closes the said circuit after the arm $b$ reaches the stop $d$ and before it begins its return movement therefrom, thus causing the magnet $f$ to release the wheel $a$, leaving it free to move while the arm $b$ is moving from the stop $c$ to the stop $d$, and locking the said wheel while the arm is moving in the opposite direction. The circuit-closer $n$ of the magnets $e$ is operated by a cam, $n'$, the surface of which has such relation to the cams $h$ and $m'$ that, after the arm $b$ has come to rest on the stop $c$, and before the circuit-closer $m$ is opened, the circuit-closer $n$ is closed, thus causing the magnets $e$ to connect the wheel $a$ and arm $b$ while the latter is stationary in its lower position, the circuit of the said magnets remaining closed until after the arm $b$ moves from the stop $c$ to the one $d$, thus causing the wheel previously released by the magnet $f$ to accompany the said arm, and after it arrives at the stop $d$, and after the circuit-closer $m$ has been closed, but before the arm $b$ begins its return movement, the circuit-closer $n$ is opened, thus permitting the said arm to make its return movement independently of the wheel.

It is obvious that the magnets may act on the face of the wheel, as shown in Fig. 1, or on its periphery, as shown in Fig. 2, each construction being desirable in some cases; or a part of the magnets may act on the periphery and a part on the face.

In operation the apparatus may be used for producing either rotary or rectilinear movement. In the former application it may be used to space the teeth of a gear being cut, or to graduate a circle. In this case the circle to be graduated or spaced or the gear to be cut will be fixed upon the shaft of the wheel $a$, and a suitable mark made upon the said wheel as a starting-point, which may be observed, if desired, by a microscope fixed upon the frame-work. Then, after the stop $d$ has been set approximately, the arm $b$ will be moved back and forth a number of times equal to the number of parts that the circle is to be divided into, and it will be observed whether or not the mark is brought back to the starting-point. If it is not, the proper adjustment will be made in the stop $d$, the movement of the said stop being much greater, and consequently more easily observed, than the corresponding movement of the wheel $a$, which will then be turned to again set the mark at the starting-point, as before, and then spaced again, the operation being repeated until the stop $d$ is finally adjusted, so that the wheel will return to the starting-point in the desired number of movements, when it will be known that the space corresponding to each movement will be one of the desired divisions of the entire periphery.

When the invention is applied to a screw-dividing engine, as shown in Figs. 2 and 3, for dividing a linear measure into a number of equal parts, the shaft $r$ of the wheel $a$ constitutes the feed-screw, and engages a nut on a carriage, $s$, carrying the article that is to be graduated or divided into a number of equal divisions of linear measure. The equal movements of the wheel $a$ will thus produce corresponding linear movements of the carriage $s$ and article carried by it. When circles are to be graduated or gears to be spaced, they will preferably be mounted on the shaft or spindle on which they are to operate before being divided, as by this method the difficulty of centering them after graduation will be avoided.

The invention is applicable to any apparatus containing an actuating device or member having a definite to-and-fro movement, and an actuated member that is to accompany the said actuating device in one direction, but not in the other, so that it will receive successive intermittent movements all in one direction.

In cases where the actuated member moves with considerable resistance, the stationary or locking magnets, as $f$, may be dispensed with.

This invention differs from most other applications of electro-magnetism in that the magnetic force is used to fasten together or unite two parts that otherwise have a sliding motion relative to one another, while in other applications the magnetic attraction has usually operated to draw one part toward another, or to prevent two parts from being separated or removed the one from the other.

I claim—

1. The combination, with a member that is to receive successive movements in one direction, of an actuating-member having a to-and-fro movement, and an electro-magnetic clamp, the two members of which clamp are without appreciable movement with relation to one another in the operation of clamping and unclamping, which is effected by changes in magnetic condition, substantially as described.

2. The combination, with the actuated member that is to receive the successive movements in one direction, and an actuating-member having a determinate to-and-fro movement, of an electro-magnet connected with the said actuating-member, and a stationary electro-magnet, both magnets being adapted to engage and hold by magnetic attraction the said actuated member, substantially as described.

3. The combination of a wheel or disk of magnetic material, and a liquid sustaining a portion of its weight, with an actuating device having a to-and-fro oscillating movement about the axis of the said disk, stops to limit such movement, and an electro-magnet attached to the said arm, having its poles fitted to the said wheel or disk, whereby the said disk and arm may be locked or fastened together by magnetic attraction, substantially as described.

In testimony whereof I have signed my name to this specification in the presence of two subscribing witnesses.

WILLIAM A. ROGERS.

Witnesses:
    JOS. P. LIVERMORE,
    W. H. SIGSTON.